US012485462B2

(12) United States Patent
Kong et al.

(10) Patent No.: US 12,485,462 B2
(45) Date of Patent: Dec. 2, 2025

(54) OPENING MACHING APPARATUS FOR HEAT TRANSFER TUBE, METHOD OF FORMING OPENING IN TUBE WALL OF HEAT TRANSFER TUBE USING SAME, AND METHOD OF REMOVING FOREIGN MATERIAL THROUGH SAME OPENING OF SAME HEAT TRANSFER TUBE

(71) Applicant: DOOSAN ENERBILITY CO., LTD, Changwon (KR)

(72) Inventors: Hyun Sang Kong, Changwon (KR); Jae Bong Lee, Changwon (KR); Yoo Yang, Daejeon (KR); Sang Beom Nam, Daejeon (KR); Gyeong Hee Nam, Daejeon (KR); Ho Sung Lee, Daejeon (KR)

(73) Assignee: DOOSAN ENERBILITY CO., LTD, Changwon (KR)

( * ) Notice: Subject to any disclaimer, the term of this patent is extended or adjusted under 35 U.S.C. 154(b) by 720 days.

(21) Appl. No.: 17/705,402

(22) Filed: Mar. 28, 2022

(65) Prior Publication Data
US 2022/0314284 A1 Oct. 6, 2022

(30) Foreign Application Priority Data

Mar. 31, 2021 (KR) .......................... 10-2021-0042040
Jun. 25, 2021 (KR) .......................... 10-2021-0083113

(51) Int. Cl.
*B08B 9/023* (2006.01)
*B08B 13/00* (2006.01)
(Continued)

(52) U.S. Cl.
CPC .............. *B08B 9/023* (2013.01); *B08B 13/00* (2013.01); *B23H 7/26* (2013.01); *B23H 7/36* (2013.01);
(Continued)

(58) Field of Classification Search
CPC .... B23H 7/26; B23H 7/36; B23H 1/00; B08B 13/00; B08B 9/027; B08B 9/023;
(Continued)

(56) References Cited

U.S. PATENT DOCUMENTS 4,665,293 A * 5/1987 Crespin ................... B23H 7/26
204/224 M
4,916,282 A * 4/1990 Chamming's ........ F22B 37/003
219/69.15
(Continued)

FOREIGN PATENT DOCUMENTS

EP 3603866 A1 * 2/2020 ............... B23H 1/04
EP 3804896 A1 * 4/2021 ............... B23H 1/08
(Continued)

OTHER PUBLICATIONS

Machine Translation of JP-2014128873-A to Eckert, Apr. 2014. (Year: 2014).*

*Primary Examiner* — Benjamin L Osterhout
(74) *Attorney, Agent, or Firm* — Harvest IP Law, LLP

(57) ABSTRACT

The opening machining apparatus for the heat transfer tube includes an electric discharge machining device inserted into the heat transfer tube and configured to form an opening in a tube wall of the heat transfer tube through an electric discharge machining, an electric discharge machining device driving device connected to the electric discharge machining device and configured to transport the electric discharge machining device, an electric discharge machining device driving device connected to the electric discharge machining device and configured to provide force for bringing the electric discharge machining device into contact with a tube wall surface of the heat transfer tube, and an electric discharge machining device rotation device configured to provide force for rotating the electric discharge machining (Continued)

device in a circumferential direction of the heat transfer tube in the heat transfer tube.

18 Claims, 9 Drawing Sheets

(51) Int. Cl.
    *B23H 7/26*     (2006.01)
    *B23H 7/36*     (2006.01)
    *F28G 13/00*     (2006.01)
    *B08B 9/027*     (2006.01)
    *B08B 9/04*     (2006.01)
    *B23H 1/00*     (2006.01)
    *F28G 1/16*     (2006.01)

(52) U.S. Cl.
    CPC .............. *F28G 13/00* (2013.01); *B08B 9/027* (2013.01); *B08B 9/04* (2013.01); *B08B 2209/02* (2013.01); *B23H 1/00* (2013.01); *F28G 1/16* (2013.01)

(58) Field of Classification Search
    CPC ....... B08B 9/04; B08B 2209/02; F28G 13/00; F28G 1/16
    See application file for complete search history.

(56) References Cited

U.S. PATENT DOCUMENTS

| | | | | |
|---|---|---|---|---|
| 5,543,599 A | * | 8/1996 | Cole | ............... F22B 37/003 |
| | | | | 376/260 |
| 5,616,259 A | * | 4/1997 | Habel | ............... B23H 7/26 |
| | | | | 219/69.2 |
| 5,897,793 A | * | 4/1999 | Chavez | ............... G21C 13/036 |
| | | | | 376/260 |
| 5,908,563 A | * | 6/1999 | Barbulescu | ............ B23H 7/265 |
| | | | | 219/69.15 |

FOREIGN PATENT DOCUMENTS

| | | | | | |
|---|---|---|---|---|---|
| JP | 1996-233702 A | | 9/1996 | | |
| JP | 1998-002988 A | | 1/1998 | | |
| JP | 2014128873 A | * | 7/2014 | ............... | B23H 7/20 |
| JP | 2015-107538 A | | 6/2015 | | |
| KR | 20-0420038 Y1 | | 6/2006 | | |
| KR | 10-1648439 B1 | | 8/2016 | | |
| WO | WO-9618476 A1 | * | 6/1996 | ............... | B23H 9/00 |
| WO | WO-2019157021 A1 | * | 8/2019 | ............ | E21B 29/02 |

\* cited by examiner

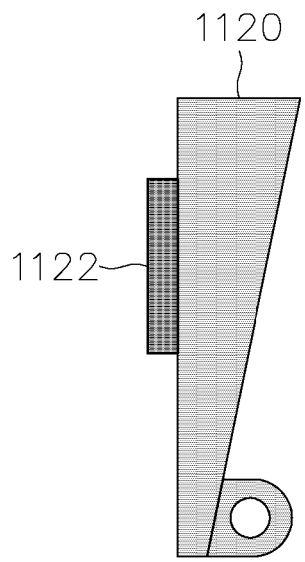 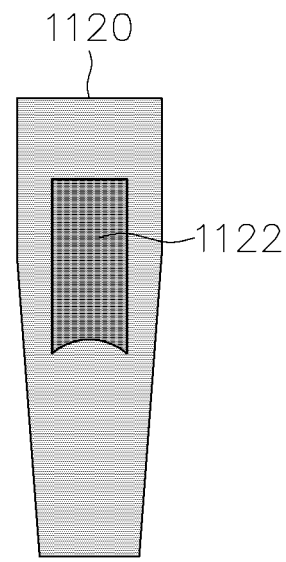 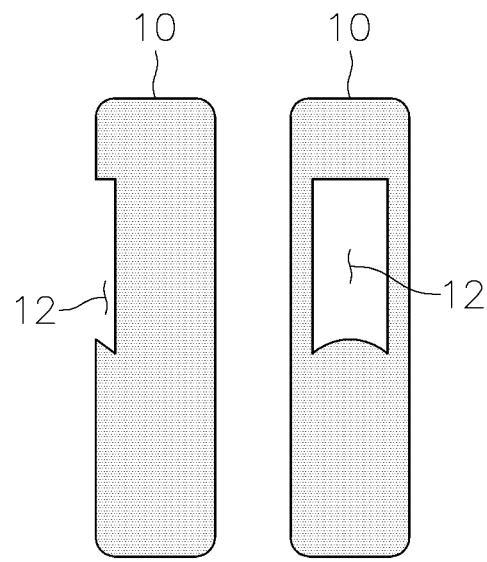 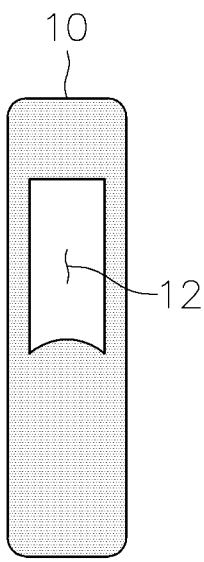
FIG. 7A  FIG. 7B  FIG. 7C  FIG. 7D
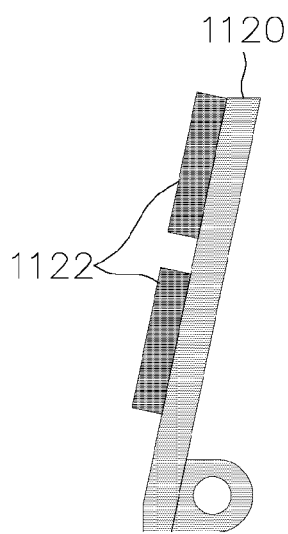 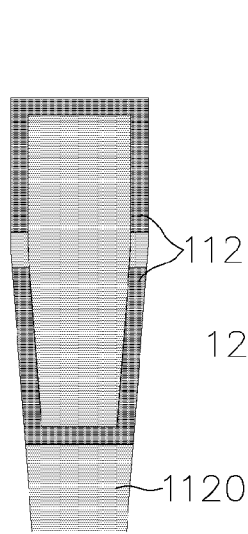 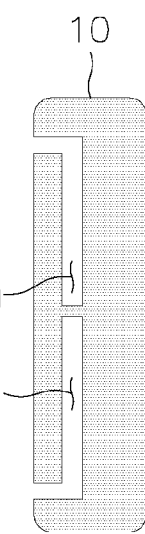 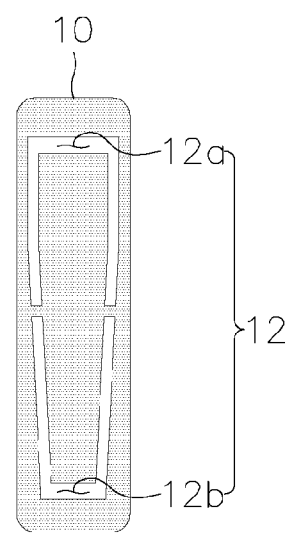
FIG. 8A  FIG. 8B  FIG. 8C  FIG. 8D

OPENING MACHING APPARATUS FOR HEAT TRANSFER TUBE, METHOD OF FORMING OPENING IN TUBE WALL OF HEAT TRANSFER TUBE USING SAME, AND METHOD OF REMOVING FOREIGN MATERIAL THROUGH SAME OPENING OF SAME HEAT TRANSFER TUBE

CROSS REFERENCE TO RELATED APPLICATIONS

This application claims priority to Korean Patent Application No. 10-2021-0042040, filed on Mar. 31, 2021, and Korean Patent Application No. 10-2021-0083113, filed on Jun. 25, 2021, the disclosures of which are incorporated herein by reference in their entireties.

BACKGROUND

1. Field

Apparatuses and methods consistent with exemplary embodiments relate to an opening machining apparatus for a heat transfer tube, a method for creating an opening in a heat transfer tube by using the same apparatus, and a method for removing foreign materials through the same opening of the heat transfer tube, and more particularly, to an opening machining apparatus for a heat transfer tube that can remove foreign substances from a wall of the heat transfer tube by forming an opening in a heat transfer tube of a steam generator installed in a nuclear power plant.

2. Description of the Related Art

A steam generator is one of the key devices in a nuclear power plant which generates steam required by a steam turbine and a generator to produce electricity.

For example, a bundle of heat transfer tubes is provided inside the steam generator, and the heat transfer tubes provide a heat exchange function between a radiative primary system water and a secondary system water that turns the turbine. The heat transfer tubes also separate the primary system water and the secondary system water from each other.

In a steam generation process, the primary system water heated while passing through a nuclear reactor flows through a pipe inside the steam generator heat transfer tube, and the secondary system water supplied from the outside flows through a pipe disposed outside the heat transfer tube. The primary system water and the secondary system water exchange heat with each other via the tube wall of the heat transfer tube. Thereafter, the primary system water returns to the reactor through a closed circulation pipe, and the secondary system water changes into steam.

That is, high-temperature and high-pressure radioactive water (i.e., the primary system water) flows through pipes of the heat transfer tubes, and non-radioactive water (i.e., the secondary system water) flows out of the pipe of the heat transfer tube. Therefore, when the pipe of the heat transfer tube is damaged, the radioactive water (i.e., primary system water) leaks to the outside and mixes with the non-radioactive water (i.e., secondary system water), resulting the non-radioactive water (i.e., secondary system water) being contaminated. The contaminated water changes into steam which contaminates the entire space of the facility. Therefore, ensuring the soundness of the heat transfer tube is one of the core tasks of nuclear power plants operation.

FIG. 1 is a partial cut-away view illustrating a steam generator according to a related art, FIG. 2 is a longitudinal cross-sectional view of the steam generator of FIG. 1, and FIG. 3 is a cross-sectional view schematically illustrating an operational principle of the steam generator according to the related art. Referring to FIGS. 1 to 3, the steam generator 10 includes an import nozzle 1 through which a reactor coolant for a primary system is introduced, a heat transfer tube 3 for heat exchange, and an export nozzle 5 through which the reactor coolant is discharged to the outside. The heat transfer tube 3 is placed on a tube sheet 4 and supported by tube support plates 6 arranged at regular height intervals in a vertical direction. A fluid distribution plate 8 is disposed between the lowermost tube support plate 6 and the tube sheet 4 to support the heat transfer tube 3. The heat transfer tube 3 and the tube support plates 6 configured to support the heat transfer tube 3 and spaced apart from each other in the vertical direction are combined with a wrapper 20. The wrapper 20 has an open lower portion and a steam discharge port 21 is formed on an upper portion. The wrapper 20 receives water flowing along an inner surface of an outer shell 2, and the introduced water is heated by the heat transfer tube 3 to change into steam which is discharged to the outside through an upper end of the wrapper 20.

In the steam generator 10, the reactor coolant discharged from the primary system flows into the steam generator 10 through the import nozzle 1, flows through the heat transfer tubes 3, and flows out from the steam generator 10 through the export nozzle 5. The reactor coolant transfers heat to secondary system coolant, and steam is generated during this process.

Here, a portion through which the reactor coolant flows is referred to as a primary side, and a portion through which water and steam flows is referred to as a secondary side. The secondary system includes a main steam system, a turbine system, and a condensate and water supply system.

The steam generated in the secondary side of the steam generator 10 moves along a main steam line to rotate the turbine.

In the related art steam generator 10 illustrated in FIG. 3, each of bundled thousands of U-shaped heat transfer tubes 3 is fixed to the tube sheet 4 which is disposed under both ends of the heat transfer tubes 3 and supported by seven-stage tube support plates 6 arranged at intervals of about 1 m in the vertical direction. As an operation time elapses, foreign materials introduced from the outside or generated from the inside are transferred to the heat transfer tubes 3 and scale is generated on an outer surface of each of the heat transfer tubes 3, thereby deteriorating heat exchange performance. In addition, the foreign materials may accumulate to be sludge between each of the heat transfer tubes 3 and each of the tube support plates 6, which gradually solidifies, thereby causing a depression between the tube support plates 6 and the heat transfer tubes 3 to cause damage to the heat transfer tubes 3. Therefore, the removal of scale from the surface of the heat transfer tubes 3, it is essential to remove sludge from the tube support plates 6 and to remove foreign materials accumulated between each of the heat transfer tube bundles 3 to secure the operation efficiency of the steam generator and the soundness of the heat transfer tubes 3.

In order to remove the foreign materials, in the related art, the heat transfer tube near the foreign materials needed to be cut and removed so that the foreign materials can be accessed. In this case, if an end portion of the heat transfer tube that is partially cut is not securely supported by the tube support plate 6, the end portion may come into contact with adjacent structures (e.g., adjacent heat transfer tubes or support columns) and be damaged due to frictional abrasion caused by fluid-inducing vibration. Therefore, there is a problem in that a position at which foreign materials can be removed by the related art cutting method is limited.

SUMMARY

Aspects of one or more exemplary embodiments provide an opening machining apparatus for heat transfer tubes in a heat exchanger that can remove foreign materials between the heat transfer tubes by forming an opening in a heat transfer tube while minimizing damage to the heat transfer tube, and a method of forming an opening in a heat transfer tube using the same apparatus and a method of removing a foreign material from the heat transfer tube through the same opening.

Additional aspects will be apparent in part in the description which follows and, in part, will become apparent from the description from the following description, or may be learned by practice of the exemplary embodiments.

According to an aspect of an exemplary embodiment, there is provided an opening machining apparatus for a heat transfer tube, the apparatus including: an electric discharge machining device inserted into the heat transfer tube and configured to form an opening in a tube wall of the heat transfer tube through an electric discharge machining; an electric discharge machining transport device connected to the electric discharge machining device to transport the electric discharge machining device; an electric discharge machining device driving device connected to the electric discharge machining device and configured to provide force for bringing the electric discharge machining device into close contact with the tube wall of the heat transfer tube; and an electric discharge machining device rotation device configured to provide force for rotating the electric discharge machining device in a circumferential direction of the heat transfer unit in the heat transfer tube.

The electric discharge machining device may include: a housing having a through hole extending in a radial direction, inserted into the heat transfer tube, and extending in a longitudinal direction of the heat transfer tube; a discharge body disposed in the housing, movably disposed through the through hole, and provided with a discharge electrode on a first surface facing the tube wall surface of the heat transfer tube; an operating shaft disposed in the housing, moved in a longitudinal direction of the housing by the electric discharge machining device driving device, and configured to move the discharge body to the outside through the through hole; and a dielectric supply member disposed in the housing and configured to supply a dielectric to the discharge electrode of the discharge body.

A second surface of the discharge body in close contact with the operating shaft may be inclined to have a downward inclination in a direction in which the operating shaft moves, and a first end of the operating shaft in close contact with the second surface of the discharge body may have an inclined surface corresponding to the inclined second surface of the discharge body.

The discharge electrode may be provided on the first surface of the discharge body to protrude from the first surface, and the discharge electrode may be provided on an entire surface of the first surface to be in contact with the tube wall surface of the heat transfer tube for surface machining.

The discharge electrode may be provided on the first surface of the discharge body to protrude from the first surface, and the discharge electrode may be provided at a periphery of an upper portion and a lower portion of the first surface to be in contact with the tube wall surface of the heat transfer tube for linear machining.

The electric discharge machining transport device may include: a first transport member provided at a front end of the electric discharge machining device; a first joint member rotatably connecting the first transport member and the electric discharge machining device; a second transport member provided at a rear end of the electric discharge machining device; a second joint member rotatably connecting the second transport member and the electric discharge machining device; and a connection cable transmitting force to move the second transport member.

The first transport member may include a first body connected to the electric discharge machining device by the first joint member and a plurality of first support rings rotatably mounted on the first body and protruding from a surface of the first body to be in close contact with an inner circumferential surface of the heat transfer tube, and the second transport member may include a second body connected to the electric discharge machining device by the second joint member and a plurality of second support rings rotatably mounted on the second body and protruding from a surface of the second body to be in close contact with the inner circumferential surface of the heat transfer tube.

The electric discharge machining device driving device may include a connection rod having a first end connected to the operating shaft via the electric discharge machining transport device and a connection rod moving device connected to a second end of the connection rod to provide force for moving the connection rod back and forth.

The electric discharge machining device rotation device may include a rotation part driving member disposed in the housing to provide force for rotating the operating shaft and an operating shaft connection member connecting the rotation part driving member to the operating shaft and transmitting rotational force supplied from the rotation part driving member to the operating shaft.

According to an aspect of another exemplary embodiment, there is provided a method of machining an opening in a tube wall of a heat transfer tube, the method including inserting an electric discharge machining device connected to an electric discharge machining transport device to form an opening in the tube wall of the heat transfer; moving the electric discharge machining device inserted into the heat transfer tube to a target site in which the opening is to be formed by using the electric discharge machining transport device; rotating the electric discharge machining device moved to the target site using an electric discharge machining device rotation device and bringing the electric discharge machining device into close contact with the tube wall of the heat transfer tube using an electric discharge machining device driving device; and forming an opening in the tube wall of the heat transfer tube by using the electric discharge machining device in close contact with the tube wall of the heat transfer tube.

According to an aspect of another exemplary embodiment, there is provided a method of removing a foreign material through an opening of a heat transfer tube, the method including: inserting an electric discharge machining device connected to an electric discharge machining transport device to form an opening in the tube wall of the heat transfer tube and moving the electric discharge machining device to a target site in which the opening is to be formed by using the electric discharge machining transport device; forming the opening through electrical discharge machining after attaching the electric discharge machining device moved to the target site to the tube wall of the heat transfer tube; removing the electric discharge machining device connected to the electric discharge machining transport device from the inside of the heat transfer tube after the opening is formed; and inserting a foreign material removal tool into the heat transfer tube with the opening, drawing a foreign material disposed outside the heat transfer tube into the inside of the heat transfer tube, and discharging the foreign material to the outside of the heat transfer tube.

The foreign material removal tool may include: gripping forceps configured to grip the foreign material; a moving shaft connected to the gripping forceps to move the gripping forceps; a manipulation handle connected to the gripping forceps and operated by an operator to rotate the gripping forceps so that the gripping forceps grasp the foreign material; a camera provided on the gripping forceps for capturing an image of a moving path of the gripping forceps; and a monitor connected to the camera and configured to check the moving path using the image captured by the camera.

According to one or more exemplary embodiments, it is possible to remove a foreign material between heat transfer tubes by forming an opening in a tube wall of a heat transfer tube disposed near the foreign material without cutting the heat transfer tubes. Therefore, it is possible to prevent the heat transfer tubes from being damaged by friction caused by fluid-inducing vibration that occurs when an end portion of the heat transfer tube is not firmly supported by a tube support plate.

BRIEF DESCRIPTION OF THE DRAWINGS

The above and other aspects will be more apparent from the following description of the exemplary embodiments with reference to the accompanying drawings, in which:

FIGS. 7A to 7D are diagrams illustrating discharge electrodes on one surface of a discharge body illustrated in FIG. 6 and a shape of an opening formed in the heat transfer tube by the discharge electrodes;

FIGS. 8A to 8D are diagrams illustrating a modified example of the discharge electrode illustrated in FIGS. 7A to 7D and a shape of an opening of a heat transfer tube formed by the modified discharge electrode;

DETAILED DESCRIPTION

Figure 1:
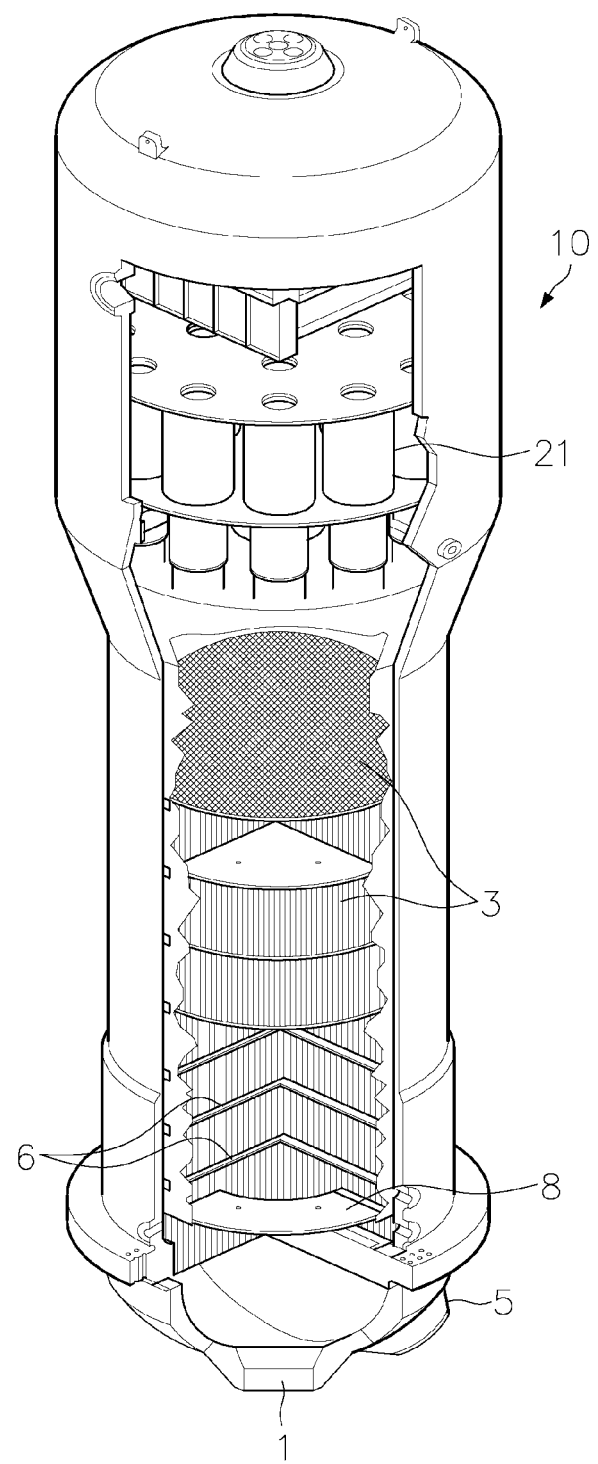
FIG. 1 is a cross-sectional view schematically illustrating a steam generator according to a related art.
Figure 2:
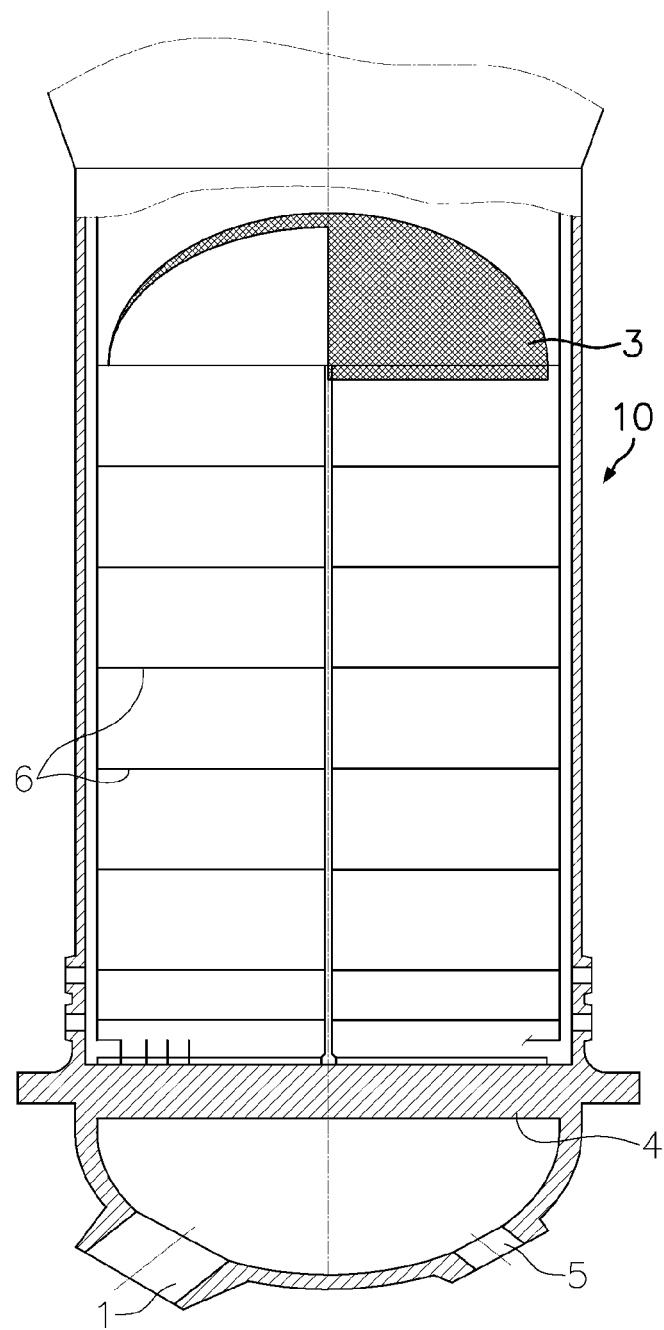
FIG. 2 is a front view of the steam generator illustrated in FIG. 1.
Figure 3:
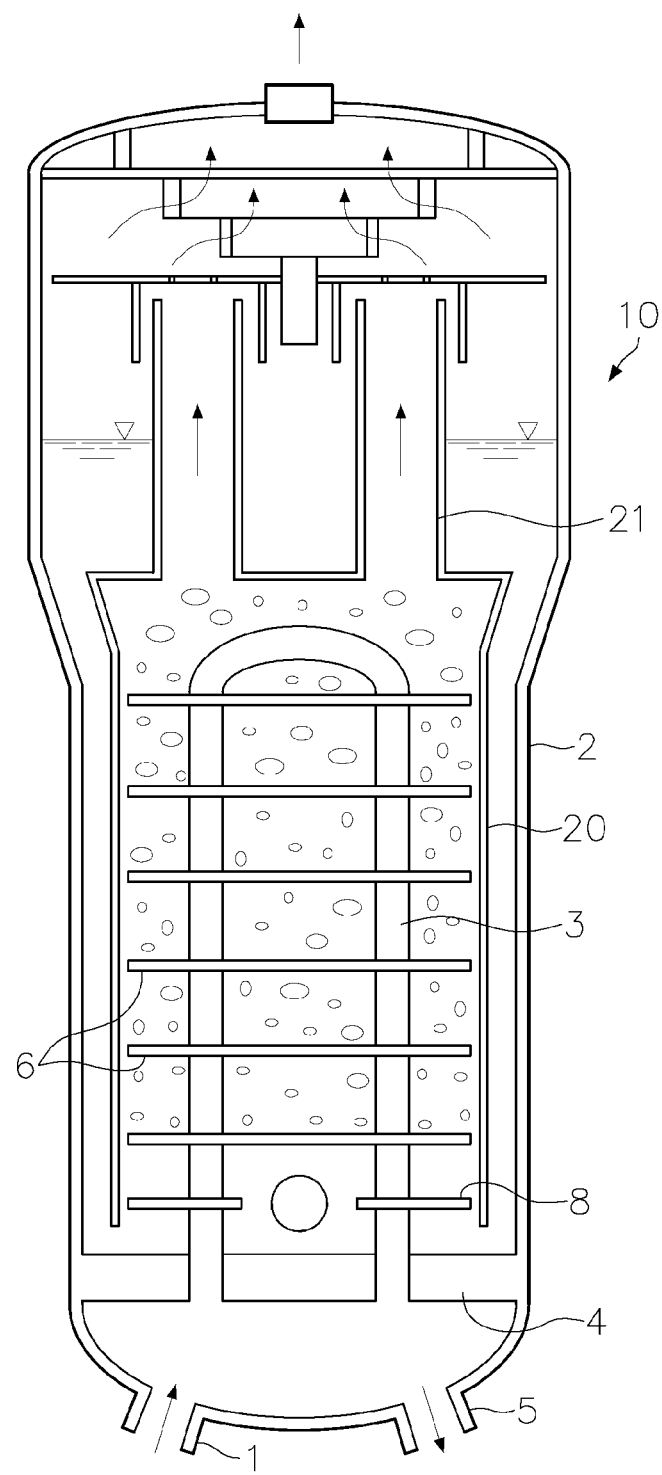
FIG. 3 is a cross-sectional view schematically illustrating a principle of a steam generator according to the related art.

Various modifications and various embodiments will be described in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

The terminology used herein is for the purpose of describing specific embodiments only and is not intended to limit the scope of the disclosure. The singular expressions "a", "an", and "the" are intended to include the plural expressions as well unless the context clearly indicates otherwise. In the disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Exemplary embodiments will be described below in detail with reference to the accompanying drawings. It should be noted that like reference numerals refer to like parts throughout the various figures and exemplary embodiments. In certain embodiments, a detailed description of functions and configurations well known in the art may be omitted to avoid obscuring appreciation of the disclosure by a person of ordinary skill in the art. For the same reason, some components may be exaggerated, omitted, or schematically illustrated in the accompanying drawings.

Figure 4:
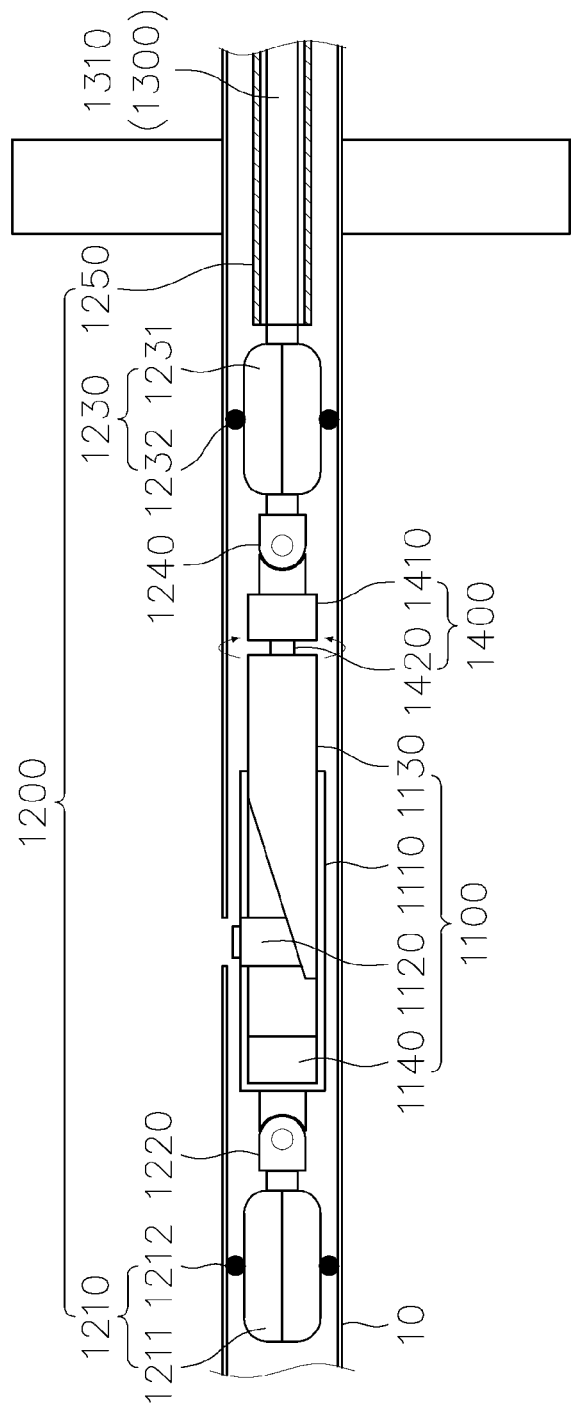
FIG. 4 is a diagram schematically illustrating an opening machining apparatus for a heat transfer tube according to an exemplary embodiment.
Figure 5:
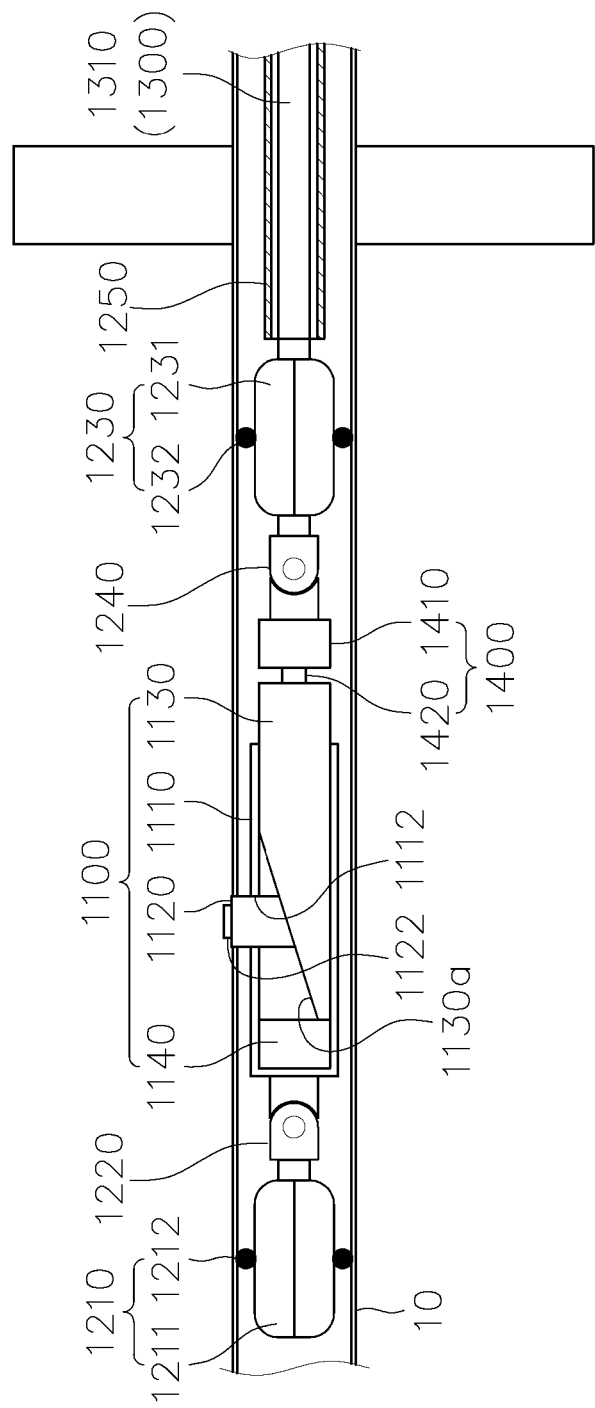
FIG. 5 is a diagram schematically illustrating a process of forming an opening in a curved heat transfer tube using the opening machining apparatus of FIG. 4.
Figure 6:
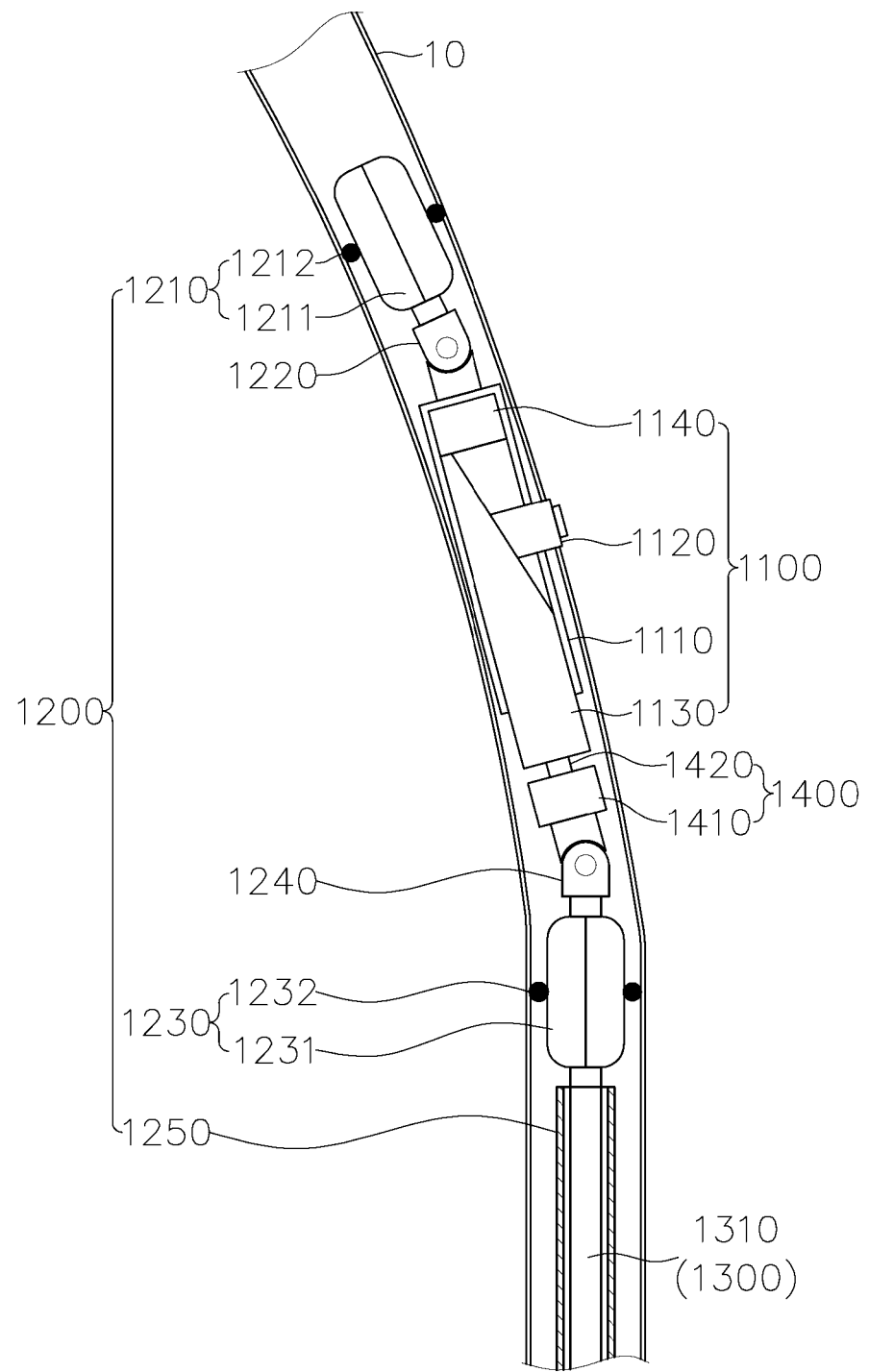
FIG. 6 is a diagram schematically illustrating a process of forming an opening in a heat transfer tube using the opening machining apparatus of FIG. 4.

FIG. 4 is a diagram schematically illustrating an opening machining apparatus for a heat transfer tube according to an exemplary embodiment. FIG. 5 is a diagram schematically illustrating a process of forming an opening in a curved heat transfer tube using the opening machining apparatus of FIG. 4. FIG. 6 is a diagram schematically illustrating a process of forming an opening in a heat transfer tube using the opening machining apparatus of FIG. 4. FIGS. 7A to 7D are diagrams illustrating discharge electrodes on one surface of a discharge body illustrated in FIG. 6 and a shape of an opening formed in the heat transfer tube by the discharge electrodes. FIGS. 8A to 8D are diagrams illustrating a modified example of the discharge electrode illustrated in FIGS. 7A to 7D and a shape of an opening of a heat transfer tube formed by the modified discharge electrode.

Referring to FIGS. 4 to 8, an opening machining apparatus 1000 for a heat transfer tube according to an exemplary embodiment includes an electric discharge machining device 1100, an electric discharge machining transport device 1200, an electric discharge machining device driving device 1300, and an electric discharge machining device rotation device 1400.

Referring to FIGS. 4 and 5, the electric discharge machining device 1100 is moved by being inserted into a heat transfer tube 10 of a steam generator used in a nuclear power plant. The electric discharge machining device 1100 serves to form an opening 12 in a tube wall of the heat transfer tube 10 through heat dissipation to remove a foreign material present between heat transfer tubes of a heat exchanger in which heat exchange tube bundles are installed.

The electric discharge machining device 1100 includes a housing 1110, a discharge body 1120, an operating shaft 1130, and a dielectric supply member 1140. The housing 1110 has a through hole 1112 extending in a radial direction and is inserted into the heat transfer tube 10 to extend in a longitudinal direction of the heat transfer tube 10. A support bearing in close contact with the inner wall surface of the heat transfer tube 10 is provided on a circumferential surface of the housing 1110, and the housing 1110 can be spaced apart from the inner wall surface of the heat transfer tube 10 by the support bearing.

The discharge body 1120 is accommodated in the housing 1110 and is movably disposed along the through hole 1112 formed in the housing 1110. A discharge electrode 1122 for forming an opening in the heat transfer tube 10 through electric discharge machining is provided on one surface of the discharge body 1120 in close contact with the inner wall surface.

Referring to FIGS. 7A to 7D, the discharge electrode 1122 is disposed on a surface of the discharge body 1120 to protrude from the surface of the discharge body 1120. The discharge electrode 1122 is formed on an entire area of the body surface facing the inner wall surface of the heat transfer tube 10. Because the discharge electrode 1122 is formed on the entire area of the body surface facing the inner wall surface of the heat transfer tube 10, an opening 12 corresponding to the entire body surface on which the discharge electrode 1122 is formed is formed in the corresponding region of the heat transfer tube 10.

Referring to FIGS. 8A to 8D, the discharge electrode 1122 is installed to protrude from a surface of a discharge body 1120. The discharge electrode 1122 is linearly formed to extend along the periphery of the body surface opposite to the inner wall surface of the heat transfer tube 10. The discharge electrode 1122 includes an upper frame portion and a lower frame portion. Because the upper frame portion and the lower frame portion of the discharge electrode 1122 are in contact with the inner wall surface of the heat transfer tube 10, an opening 12 including an upper linear opening 12a and a lower linear opening 12b is formed in the heat transfer tube 10. The electric discharge machining device 1100 is drawn out from the heat transfer tube 10 through the linear openings 12a and 12b of the heat transfer tube 10, and a gripper is inserted into the heat transfer tube 10 to connect the upper linear opening 12a and the lower linear opening 12b so that the opening 12 is formed in the heat transfer tube 10. A cut portion of the heat transfer tube 10 to form the opening 12 is removed from the heat transfer tube 10.

Referring to FIGS. 4 to 6, the operating shaft 1130 is disposed inside the housing 1110 and is moved in the housing 1110 along the longitudinal direction of the housing 1110 by the electric discharge machining transport device 1300, thereby moving the discharge body 1120 outward or inward through the through hole 1112.

A surface of the discharge body 1120 in contact with the operating shaft 1130 is inclined to have a downward slope along the longitudinal direction of the housing 1110. In addition, an end of the operating shaft 1130 in contact with one surface of the discharge body 1120 has an inclined surface 1130a corresponding to the inclined surface of the discharge body 1120.

When the operating shaft 1130 is moved forward along the longitudinal direction of the housing 1110 by the electric discharge machining transport device 1300, the body 1120 having the discharge electrode 1122 is moved outward from the inside of the housing 1110 through the through hole 1112. On the other hand, when the operating shaft 1130 is moved backward along the longitudinal direction of the housing 1110, the discharge electrode 1122 is moved into the housing 1110 from the outside. The inside of the housing 1110 and the body 1120 having the discharge electrode 1122 are connected by an elastic member. When the operating shaft 1130 moves backward by an elastic force of the elastic member, the body 1120 having the discharge electrode 1122 disposed outside the housing 1110 returns to the inside of the housing 1110.

The dielectric supply member 1140 provided in the housing 1110 supplies dielectric (i.e., discharge fluid) so that the discharge electrode 1122 provided in the body 1120 can form an opening in the tube wall of the heat transfer tube 10 through electrical discharge machining.

The electric discharge machining device 1100 is connected to the electric discharge machining device transfer device 1200 which serves to move the electric discharge machining device 1100. The electric discharge machining transport device 1200 includes a first transport member 1210, a first joint member 1220, a second transport member 1230, a second joint member 1240, and a connection cable 1250.

The first transport member 1210 is provided at a front end of the electric discharge machining device 1100 and includes a first body 1211 and a plurality of first support rings 1212. The first transport member 1210 is rotatably connected to the electric discharge machining device 1100 via the first joint member 1220.

The first body 1211 is connected to the housing 1110 of the electric discharge machining device 1100 via the first joint member 1220, and the plurality of first support rings 1212 are rotatably mounted on the first body 1211. The first support ring 1212 mounted on the first body 1211 protrudes from a surface of the first body 1211 and is in close contact with the inner circumferential surface of the heat transfer tube 10 so that the first body 1211 can easily move in the heat transfer tube 10.

The second transport member 1230 is provided at a rear end of the electric discharge machining device 1100, and includes a second body 1231 and a plurality of second support rings 1232. The second transport member 1230 is rotatably connected to the electric discharge machining device 1100 via the second joint member 1240, and the operating shaft 1130 is connected to the second transport member 1230 via the electric discharge machining device rotation device 1400.

The second body 1231 is connected to the operating shaft 1130 of the electric discharge machining device 1100 via the second joint member 1240 and the electric discharge machining device rotation device 1400, and the plurality of second support rings 1232 are rotatably mounted on the second body 1231.

The second support ring 1232 mounted on the second body 1231 protrudes from a surface of the second body 1231 and is in close contact with the inner circumferential surface of the heat transfer tube 10 so that the second body 1231 can easily move in the heat transfer tube 10.

Because the electric discharge machining device 1100 is moved in a state in which the first joint member 1220 and the second joint member 1240 are connected to the front end and the rear end of the electric discharge machining device 1100, respectively, the electric discharge machining device 1100 can be easily moved in the heat transfer tube 10 although the heat transfer tube 10 has a curved shape. The first body 1211 and the second body 1231 have a cylindrical shape.

A first end of the second transport member 1240 is connected to the operating shaft 1130 by the electric discharge machining device rotation device 1400, and a second end of the second transfer member 1240 is connected to the connection cable 1250. The connection cable 1250 serves to transmit power for moving the second transport member

1240. For example, an operator holds one end of the connection cable 1250 to which the second end of the second transport member 1240 is connected and pushes the second connection cable 1250 to move the electric discharge machining transport device 1200 into the heat transfer tube 10. As the connection cable 1250 is pushed, the second transport member 1240 is moved and thus the first transport member 1240 is also moved in the heat transfer tube 10. In addition, the electric discharge machining device 1100 is also moved in the heat transfer tube 10.

The electric discharge machining device 1100 is connected to the electric discharge machining device driving device 1300 which provides electric power so that the electric discharge machining device 1100 is in close contact with the tube wall of the heat transfer tube 10. Because the electric discharge machining device driving device 1300 provides power, the discharge body 1120 having the discharge electrode 1122 of the electric discharge machining device 1100 is in close contact with the tube wall of the heat transfer tube 10, so that an opening 12 can be formed in the tube wall of the heat transfer tube 10.

The electric discharge machining device driving device 1300 includes a connection rod 1310 and a connection rod moving member. A first end of the connection rod 1310 is connected to the operating shaft 1130 of the electric discharge machining device 1100 by the electric discharge machining transport device 1200, and a second end of the connection rod 1310 is connected to the connection rod moving member. The connection rod moving member provides power for linearly moving the connecting rod 1310 forward and backward. As the connection rod 1310 is moved back and forth by the force of the connection rod moving member, the discharge body 1120 provided with the discharge electrode 1122 passes through the through hole 1112 of the housing 1110 to contact or separate from the tube wall of the heat transfer tube 10. When the discharge body 1120 is in contact with the tube wall, the opening 12 is formed, and the discharge body 1120 is separated from the tube wall and moved inwardly to be disposed in the housing 1110. The connection rod 1310 is connected to the second transport member 1230 of the electric discharge machining transport device 1200 through the connection cable 1250.

The electric discharge machining device 1100 is rotated in the circumferential direction in the heat transfer tube 10 by the electric discharge machining device rotation device 1400 which provides force for rotating the electric discharge machining device 1100 in the circumferential direction of the heat transfer tube 10.

The electric discharge machining device rotation device 1400 includes a rotation part driving member 1410 and an operation shaft connection member 1420. The rotation part driving member 1410 is disposed in the housing 1110 and serves to provide force for rotating the operating shaft 1130. The rotation part driving member 1410 is disposed to correspond to the dielectric supply member 1140 with the operating shaft 1130 interposed therebetween.

The operation shaft connection member 1420 connects the rotation part driving member 1410 to the operating shaft 1130 and transmits the rotational force supplied from the rotation part driving member 1410 to the operating shaft 1130. As the operating shaft 1130 rotates by the rotational force supplied from the rotation part driving member 1410, the electric discharge machining device 1100 rotates in the circumferential direction in the heat transfer tube 10.

The electric discharge machining device 1100 is moved to a position in which the opening 12 is to be formed in the heat transfer tube 10 by the electric discharge machining transport device 1200, and is rotated to face the inner surface of the tube wall of the heat transfer tube 10 by the electric discharge machining device rotation device 1400. Then, the discharge body 1120 of the electric discharge machining device 1100 is brought into close contact with the inner surface of the tube wall of the heat transfer tube 10 by the electric discharge machining device driving device 1300. In this state, a line-shaped or planar opening 12 is formed in the tube wall of the heat transfer tube 10 by the discharge electrode 1122.

Figure 9:
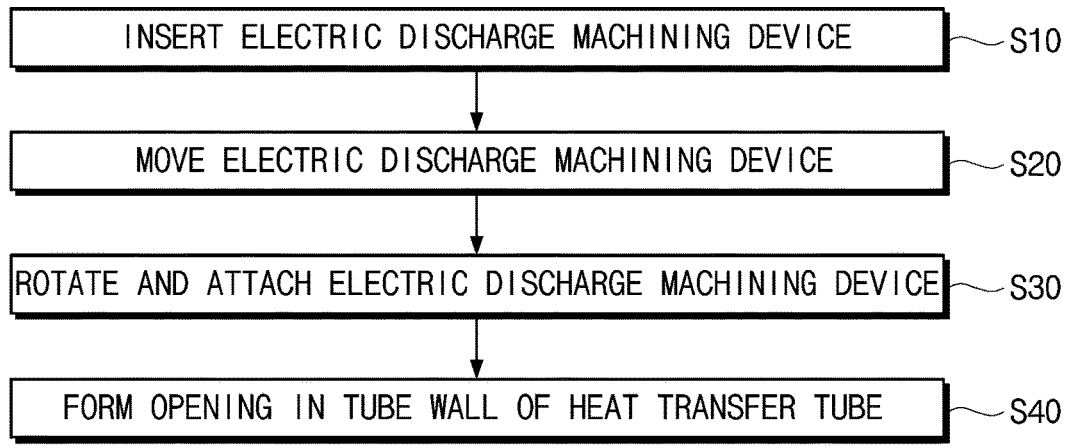
FIG. 9 is a flowchart illustrating a method for forming an opening in a heat transfer tube according to another exemplary embodiment.

FIG. 9 is a flowchart illustrating a method for forming an opening in a heat transfer tube according to another exemplary embodiment. Referring to FIG. 9, a machining method for forming an opening in a heat transfer tube includes an electric discharge machining device insertion step S10, an electric discharge machining device moving step S20, an electric discharge machining device rotation and attachment step S30, and an opening machining step S40.

Referring to FIGS. 4 and 9, in the electric discharge machining device insertion step S10, an opening machining apparatus 1000 for a heat transfer tube, which includes an electric discharge machining device 1100, an electric discharge machining transport device 1200, an electric discharge machining device driving device 1300, and an electric discharge machining device rotation device 1400, is used. In step S10, the electric discharge machining device 1100 is inserted into a heat transfer tube 10 that is a machining target in which an opening 12 is to be formed. For example, the electric discharge machining device 1100 connected to the electric discharge machining transport device 1200 is inserted into the heat transfer tube 10 to perform electric discharge machining.

The electric discharge machining device 1100 includes a housing 1110, a discharge body 1120, an operating shaft 1130, and a dielectric supply member 1140. Because the housing 1110, the discharge body 1120, the operating shaft 1130, and the dielectric supply member 1140 are the same as those described in the embodiment described above, a redundant description thereof will be omitted.

In the electric discharge machining device moving step S20, the electric discharge machining device 1100 is moved to a target site in which the opening 12 is to be formed in the heat transfer tube 10 by using the electric discharge machining transport device 1200.

The electric discharge machining transport device 1200 serves to move the electric discharge machining device 1100. The electric discharge machining transport device 1200 includes a first transport member 1210, a first joint member 1220, a second transport member 1230, a second joint member 1240, and a connection cable 1250. For example, an operator uses the connection cable 1250 to move the first transport member 1210, the first joint member 1220, the second transport member 1230, and the second joint member 1240 in the heat transfer tube 10 so that the electric discharge machining device 1100 connected to the first joint member 1220 and the second joint member 1240 is moved in the heat transfer tube 10. Here, an endoscope device may be used in the electric discharge machining device moving step S20. After the endoscope device is sent to the target site to form the opening 12 through a second end of the heat transfer tube 10, the electric discharge machining device 1100 is inserted into the heat transfer tube 10 through a first end of the heat transfer tube 10 and transported to the target site in which the endoscope device is located. It is possible to precisely move the electric discharge machining device 1100 to the accurate target site by using the endoscope device. Because the first transport member 1210, the first joint member 1220, the second transport member 1230, the second joint member 1240, and the connection cable 1250 of the electric discharge machining transport device 1200 are the same as those of the opening machining apparatus 1000 according to the embodiment described above, a redundant description thereof will be omitted.

In the electric discharge machining device rotation and attachment step S30, the electric discharge machining device 1100 moved to the target site by the electric discharge machining transport device 1200 is rotated by the electric discharge machining device rotation device 1400 to face the inner surface of the tube wall of the heat transfer tube 10 and is in close contact with the inner surface of the tube wall of the heat transfer tube 10 at the target site by the electric discharge machining device driving device 1300.

The electric discharge machining device rotation device 1400 for rotating the electric discharge machining device 1100 includes a rotation part driving member 1410 and an operating shaft connection member 1420. The rotation part driving member 1410 is disposed in the housing 1110 to provide force for rotating the operating shaft 1130.

The operating shaft connection member 1420 connects the rotation part driving member 1410 to the operating shaft 1130 of the electric discharge machining device 1100 and transmits the rotational force supplied from the rotation part driving member 1410 to the operating shaft 1130. As the operating shaft 1130 rotates by the rotational force supplied from the rotation part driving member 1410, the operating shaft 1130 of the electric discharge machining device 1100 rotates in the circumferential direction in the heat transfer tube 10.

The electric discharge machining device driving device 1300 for attaching the electric discharge machining device 1100 to the tube wall of the heat transfer tube 10 in which the opening 12 is to be formed includes a connection rod 1310 and a connection rod moving member. A first end of the connection rod 1310 is connected to the operating shaft 1130 via the electric discharge machining transport device 1200, and a second end of the connection rod 1310 is connected to the connection rod moving member. The connection rod moving member provides operational force for linearly moving the connecting rod 1310 forward and backward. As the connection rod 1310 is moved back and forth by the force provided by the connection rod moving member, the discharge body 1120 provided with the discharge electrode 1122 passes through the through hole 1112 of the housing 1110 to contact or separate from the tube wall of the heat transfer tube 10. When the discharge body 1120 is in contact with the tube wall, the opening 12 is formed, and the discharge body 1120 is separated from the tube wall and moved inwardly to be disposed in the housing 1110.

In the opening machining step S40, the electrical discharge machining device 1100 in close contact with the tube wall of the heat transfer tube 10 is electrically driven to form the opening 12 in the tube wall of the heat transfer tube 10. According to the shape of the discharge electrode 1122, as shown in FIGS. 7A to 8D, the heat transfer tube 10 is surface-machined or linearly machined to form an upper linear opening 12a and a lower linear opening 12b. After forming the upper and lower openings 12a and 12b, the electric discharge machining device 1100 is removed from the heat transfer tube 10. Next, a gripper is inserted into the heat transfer tube 10 to connect the upper linear opening 12a and the lower linear opening 12b so that the opening 12 is formed in the tube wall of the heat transfer tube 10. The debris of the heat transfer tube 10 during the formation of the opening 12 is removed from the heat transfer tube 10.

Figure 10:
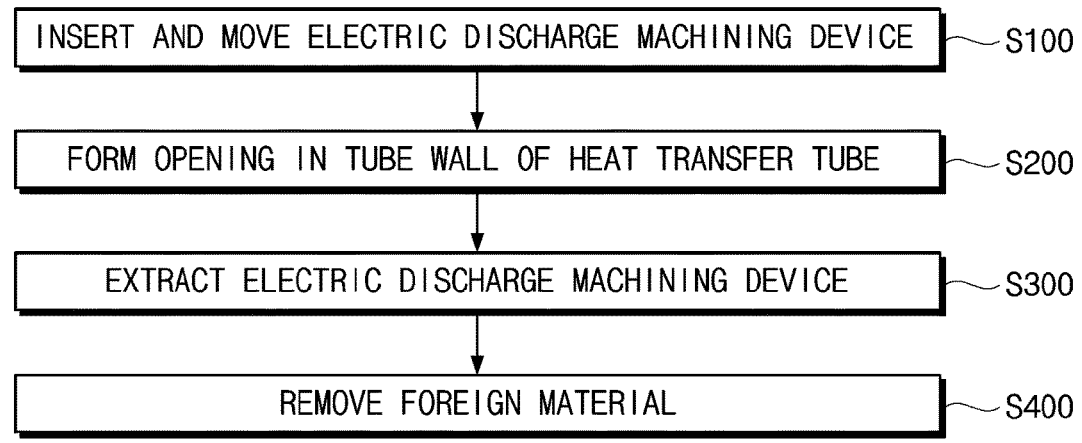
FIG. 10 is a flowchart illustrating a method for removing a foreign material according to another exemplary embodiment.
Figure 11:
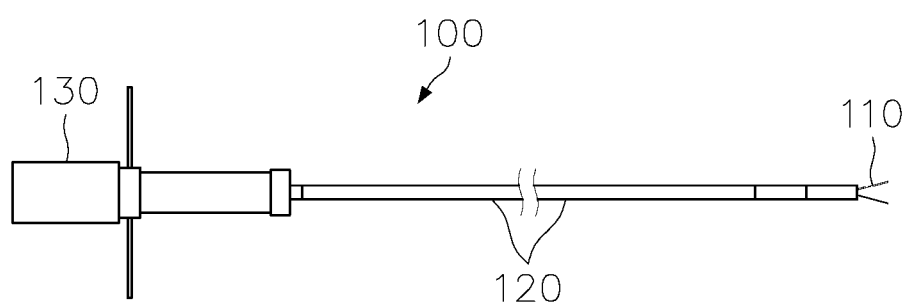
FIG. 11 is a diagram schematically illustrating a foreign material removing tool used in a method for removing a foreign material through the opening of the heat transfer tube.

FIG. 10 is a flowchart illustrating a method for removing a foreign material according to another exemplary embodiment. FIG. 11 is a diagram schematically illustrating a foreign material removing tool used in a method for removing a foreign material through the opening of the heat transfer tube.

Referring to FIG. 10, a method for removing foreign materials through an opening of a heat transfer tube includes a discharge machining device insertion and moving step S100, a heat transfer tube opening machining step S200, and an electrical discharge machining device extraction step S300, and a foreign material removal step S400.

Referring to FIGS. 10 and 11, in the electric discharge machining device insertion and moving step S100, an opening machining apparatus 1000 for a heat transfer tube, which includes an electric discharge machining device 1100, an electric discharge machining transport device 1200, an electric discharge machining device driving device 1300, and an electric discharge machining device rotation device 1400, is used. In step S100, the electric discharge machining device 1100 is inserted into a heat transfer tube 10 that is a machining target in which an opening 12 is to be formed. For example, the electric discharge machining device 1100 connected to the electric discharge machining transport device 1200 is inserted into the heat transfer tube 10 to perform electric discharge machining. Because the configuration of the electric discharge machining device 1100 and the electric discharge machining transport device 1200 are the same as in the embodiment described above, a redundant description thereof will be omitted.

In the opening machining step S200, the electrical discharge machining device 1100 in close contact with the tube wall of the heat transfer tube 10 is electrically powered to form the opening 12 in the tube wall of the heat transfer tube 10.

It is preferable to perform the electric discharge machining device rotation and attachment step before starting the opening machining step S200. Here, the electric discharge machining device rotation and attachment step is substantially the same as the electric discharge machining device rotation and attachment step S30 of the heat transfer tube opening machining method according to the embodiment of FIG. 9, a redundant description thereof will be omitted.

In the electric discharge machining device extraction step S300, the electric discharge machining device 1100 and the electric discharge machining transport device 1200 connected to the electric discharge machining device 1100 located in the heat transfer tube 10 are withdrawn from the heat transfer tube 10. In the electric discharge machining device extraction step S300, an operator may pull out the connection cable 1250 connected to the electric discharge machining device 1100 to remove the electric discharge machining device 1100 connected to the connection cable 1250 from the heat transfer tube 10.

In the foreign material removal step S400, a foreign material removal tool 100 collects foreign materials in the heat transfer tube 10 and discharges the collected foreign materials to the outside of the heat transfer tube 10.

The foreign material removal tool 100 is inserted into the heat transfer tube 10 to pull the foreign materials deposited on the outside the heat transfer tube 10 into the heat transfer tube 10 at one side of the heat transfer tube 10 and then discharges the foreign materials to the outside from the inside of the heat transfer tube 10 at other side of the heat transfer tube 10. The foreign material removal tool 100 for removing the foreign material may include a gripping forceps 110, a moving shaft 120, and a manipulation handle 130.

The gripping forceps 110 serves to grip a foreign material deposited on the outside of the heat transfer tube 10 through the opening 12. The gripping forceps 110 is connected to the moving shaft 120 so that the gripping forceps 110 can be moved in the heat transfer tube 10. The gripping forceps 110 is connected to the manipulation handle 130. The operator operates the manipulation handle 130 to move the moving shaft 120 and rotate the gripping forceps 110.

The gripping forceps 110 may be provided with a camera. The camera takes images of objects in front of the gripping forceps 110 while the gripping forceps 110 moves and captures the foreign material to be gripped by the gripping forceps 110. The images captured by the camera are transmitted to a monitor so that the operator can remove the foreign material through the opening 12 while monitoring the movement of the gripping forceps 110 in the images captured by the camera.

Therefore, foreign materials adhering to the heat transfer tubes 10 can be removed without disassembling all of the heat transfer tubes 10. That is, according to one or more exemplary embodiments, by forming an opening 12 in the tube wall of one heat transfer tube 10, foreign materials deposited between the heat transfer tube 10 and the other heat transfer tube 10 through the opening 12 can be removed. Accordingly, it is possible to prevent an end portion of the heat transfer tube 10 from being worn due to friction between the end portion of the heat transfer tube 10 and an adjacent object, in which the friction may occur due to fluid-inducing vibration when the end portion of the heat transfer tube 10 is not supported by a tube support plate.

While one or more exemplary embodiments have been described with reference to the accompanying drawings, it is to be understood by those skilled in the art that various modifications and changes in form and details may be made therein without departing from the spirit and scope as defined by the appended claims. Accordingly, the description of the exemplary embodiments should be construed in a descriptive sense only and not to limit the scope of the claims, and many alternatives, modifications, and variations will be apparent to those skilled in the art.

What is claimed is:

1. A method of machining an opening in a tube wall of a heat transfer tube, the method comprising:
    inserting an electric discharge machining device connected to an electric discharge machining transport device to form an opening in the tube wall of the heat transfer tube;
    moving the electric discharge machining device inserted into the heat transfer tube to a target site in which the opening is to be formed by using the electric discharge machining transport device;
    rotating the electric discharge machining device moved to the target site using an electric discharge machining device rotation device and bringing the electric discharge machining device into contact with the tube wall of the heat transfer tube using an electric discharge machining device driving device; and
    forming an opening in the tube wall of the heat transfer tube by using the electric discharge machining device in contact with the tube wall of the heat transfer tube,
    wherein the electric discharge machining device comprises:
        a housing having a through hole extending in a radial direction, inserted into the heat transfer tube, and extending in a longitudinal direction of the heat transfer tube;
        a discharge body disposed in the housing, movably disposed through the through hole, and provided with a discharge electrode on a first surface facing the tube wall surface of the heat transfer tube;
        an operating shaft disposed in the housing, moved in a longitudinal direction of the housing by the electric discharge machining device driving device, and configured to move the discharge body to the outside through the through hole; and
        a dielectric supply member disposed in the housing and configured to supply a dielectric to the discharge electrode of the discharge body.

2. The method according to claim 1, wherein a second surface of the discharge body in contact with the operating shaft is inclined to have a downward inclination in a direction in which the operating shaft moves, and
    a first end of the operating shaft in contact with the second surface of the discharge body has an inclined surface corresponding to the inclined second surface of the discharge body.

3. The method according to claim 2, wherein the discharge electrode is provided on the first surface of the discharge body to protrude from the first surface, and the discharge electrode is provided on an entire surface of the first surface to be in contact with the tube wall surface of the heat transfer tube for surface machining.

4. The method according to claim 2, wherein the discharge electrode is provided on the first surface of the discharge body to protrude from the first surface, and the discharge electrode is provided at an upper portion and a lower portion of the first surface to be in contact with the tube wall surface of the heat transfer tube for linear machining.

5. The method according to claim 1, wherein the electric discharge machining transport device comprises:
    a first transport member provided at a front end of the electric discharge machining device;
    a first joint member rotatably connecting the first transport member and the electric discharge machining device;
    a second transport member provided at a rear end of the electric discharge machining device;
    a second joint member rotatably connecting the second transport member and the electric discharge machining device; and
    a connection cable transmitting force to move the second transport member.

6. The method according to claim 5, wherein the first transport member comprises a first body connected to the electric discharge machining device by the first joint member and a plurality of first support rings rotatably mounted on the first body and protruding from a surface of the first body to be in contact with an inner circumferential surface of the heat transfer tube, and
    wherein the second transport member comprises a second body connected to the electric discharge machining device by the second joint member and a plurality of second support rings rotatably mounted on the second body and protruding from a surface of the second body and configured to be in contact with the inner circumferential surface of the heat transfer tube.

7. The method according to claim 1, wherein the electric discharge machining device driving device comprises:

a connection rod having a first end connected to the operating shaft via the electric discharge machining transport device; and a connection rod moving device connected to a second end of the connection rod to provide force for moving the connection rod back and forth.

8. The method according to claim 7, wherein the electric discharge machining device rotation device comprises:

a connection rod attachment member in contact with a circumferential surface of the connection rod; and a connection rod rotation member connected to the connection rod attachment member to provide force for rotating the connection rod attachment member.

9. The method according to claim 1, further comprising:

removing the electric discharge machining device connected to the electric discharge machining transport device from an inside of the heat transfer tube after the opening is formed; and inserting a foreign material removal tool into the heat transfer tube with the opening, drawing a foreign material disposed outside the heat transfer tube into the inside of the heat transfer tube, and discharging the foreign material to an outside of the heat transfer tube.

10. The method according to claim 9, wherein the foreign material removal tool comprises:

gripping forceps configured to grip the foreign material;

a moving shaft connected to the gripping forceps to move the gripping forceps;

a manipulation handle connected to the gripping forceps and operated by an operator to rotate the gripping forceps so that the gripping forceps grasp the foreign material;

a camera provided on the gripping forceps for capturing an image of a moving path of the gripping forceps; and a monitor connected to the camera and configured to check the moving path using the image captured by the camera.

11. An apparatus that performs the method of claim 10, the apparatus comprising:

an electric discharge machining device inserted into the heat transfer tube and configured to form the opening in the tube wall of the heat transfer tube through the electric discharge;

an electric discharge machining transport device connected to the electric discharge machining device and configured to transport the electric discharge machining device;

an electric discharge machining device driving device connected to the electric discharge machining device and configured to provide force for bringing the electric discharge machining device into contact with a tube wall surface of the heat transfer tube; and an electric discharge machining device rotation device configured to provide force for rotating the electric discharge machining device in a circumferential direction of the heat transfer tube in the heat transfer tube, wherein the electric discharge machining device comprises:

a housing having a through hole extending in a radial direction, inserted into the heat transfer tube, and extending in a longitudinal direction of the heat transfer tube;

a discharge body disposed in the housing, movably disposed through the through hole, and provided with a discharge electrode on a first surface facing the tube wall surface of the heat transfer tube;

an operating shaft disposed in the housing, moved in a longitudinal direction of the housing by the electric discharge machining device driving device, and configured to move the discharge body to the outside through the through hole; and a dielectric supply member disposed in the housing and configured to supply a dielectric to the discharge electrode of the discharge body.

12. The apparatus according to claim 11, wherein a second surface of the discharge body in contact with the operating shaft is inclined to have a downward inclination in a direction in which the operating shaft moves, and a first end of the operating shaft in contact with the second surface of the discharge body has an inclined surface corresponding to the inclined second surface of the discharge body.

13. The apparatus according to claim 12, wherein the discharge electrode is provided on the first surface of the discharge body to protrude from the first surface, and the discharge electrode is provided on an entire surface of the first surface to be in contact with the tube wall surface of the heat transfer tube for surface machining.

14. The apparatus according to claim 12, wherein the discharge electrode is provided on the first surface of the discharge body to protrude from the first surface, and the discharge electrode is provided at an upper portion and a lower portion of the first surface to be in contact with the tube wall surface of the heat transfer tube for linear machining.

15. The apparatus according to claim 11, wherein the electric discharge machining transport device comprises:

a first transport member provided at a front end of the electric discharge machining device;

a first joint member rotatably connecting the first transport member and the electric discharge machining device;

a second transport member provided at a rear end of the electric discharge machining device;

a second joint member rotatably connecting the second transport member and the electric discharge machining device; and a connection cable transmitting force to move the second transport member.

16. The apparatus according to claim 15, wherein the first transport member comprises a first body connected to the electric discharge machining device by the first joint member and a plurality of first support rings rotatably mounted on the first body and protruding from a surface of the first body to be in contact with an inner circumferential surface of the heat transfer tube, and the second transport member comprises a second body connected to the electric discharge machining device by the second joint member and a plurality of second support rings rotatably mounted on the second body and protruding from a surface of the second body to be in contact with the inner circumferential surface of the heat transfer tube.

17. The apparatus according to claim 11, wherein the electric discharge machining device driving device comprises:

a connection rod having a first end connected to the operating shaft via the electric discharge machining transport device; and a connection rod moving device connected to a second end of the connection rod to provide force for moving the connection rod back and forth.

18. The apparatus according to claim 17, wherein the electric discharge machining device rotation device comprises:
- a rotation part driving member disposed in the housing to provide force for rotating the operating shaft; and
- an operating shaft connection member connecting the rotation part driving member to the operating shaft and transmitting rotational force supplied from the rotation part driving member to the operating shaft.

* * * * *